United States Patent [19]
DeGraff

[11] Patent Number: 6,148,483
[45] Date of Patent: Nov. 21, 2000

[54] METHOD FOR FORMING MOLDABLE HAND GRIP

[76] Inventor: Barry R. DeGraff, 580 Silvergate Loop, Lake Mary, Fla. 32746

[21] Appl. No.: 08/072,036

[22] Filed: Jun. 3, 1993

Related U.S. Application Data

[63] Continuation-in-part of application No. 07/972,227, Nov. 5, 1992, abandoned.
[51] Int. Cl.[7] .............................. A47J 45/00; A45C 13/26
[52] U.S. Cl. ................................. 16/430; 16/431; 16/435; 16/421; 16/DIG. 12; 16/DIG. 19
[58] Field of Search .............................. 16/430, 431, 435, 16/421, DIG. 12, DIG. 19

[56] References Cited

U.S. PATENT DOCUMENTS

| | | | |
|---|---|---|---|
| 412,479 | 10/1889 | Davis | 16/110 R |
| 4,696,842 | 9/1987 | Doubt | 428/40 |

*Primary Examiner*—Chuck Y. Mah
*Attorney, Agent, or Firm*—Allen, Dyer, Doppelt, Milbrath & Gilchrist, P.A.

[57] ABSTRACT

A moldable hand grip and method of forming the grip using a light curable moldable material. The moldable material is wrapped around a handle of a hand held implement. Pressure is then applied with the hand of a user to mold the moldable material while the temperature of the material is at ambient temperature. Light is applied to the molded material to cure the material and form a custom grip.

8 Claims, 3 Drawing Sheets

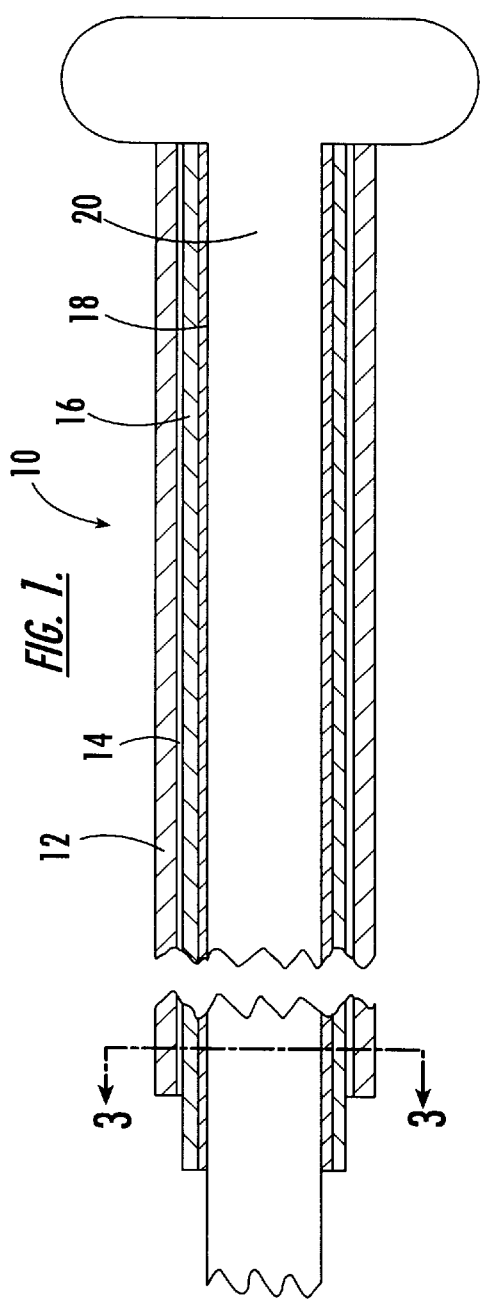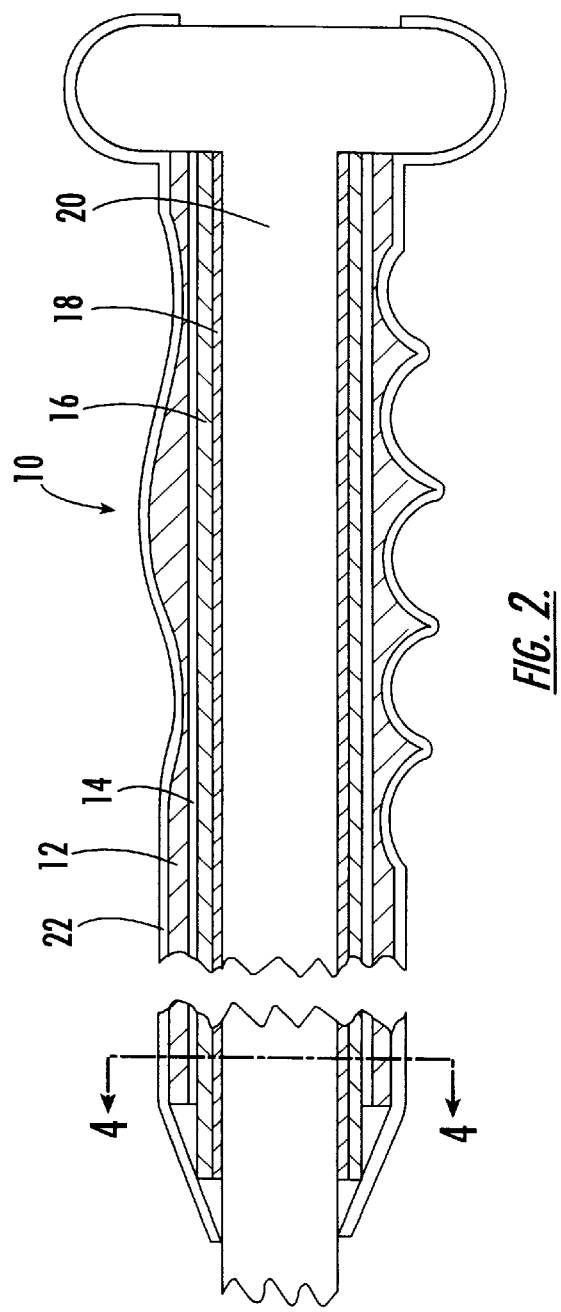

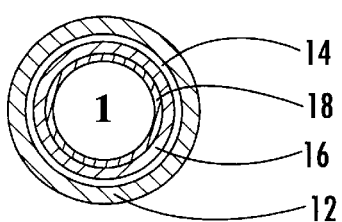
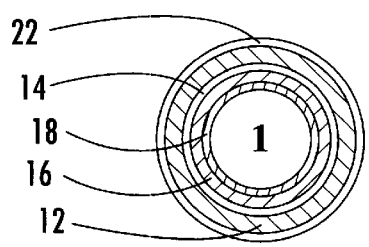
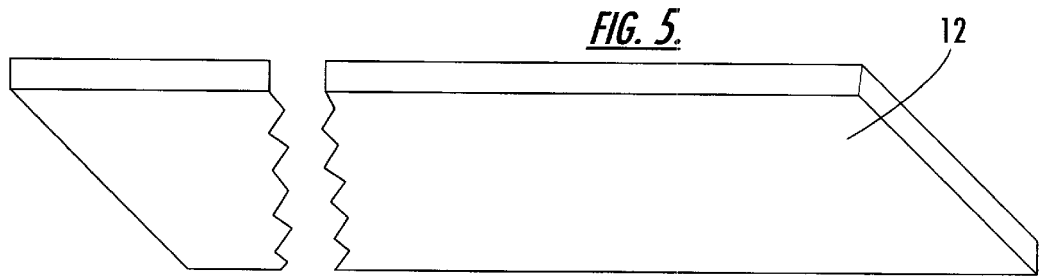
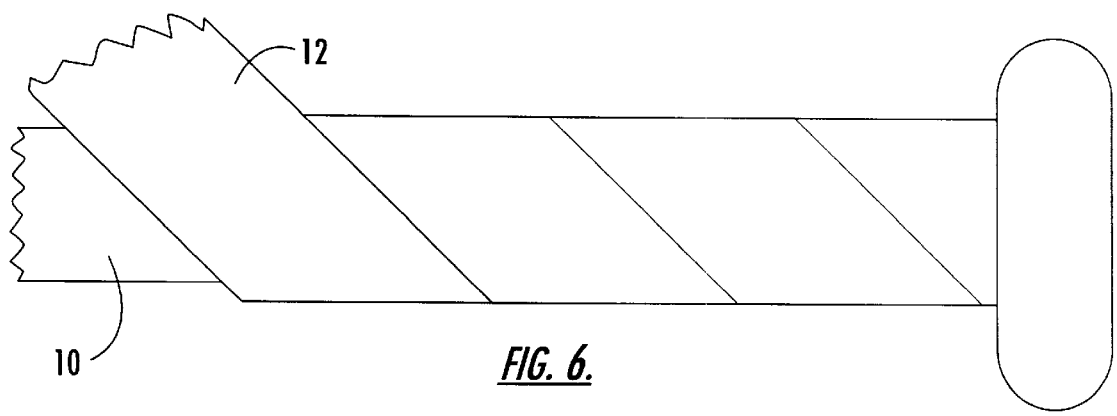

METHOD FOR FORMING MOLDABLE HAND GRIP

This application is a continuation-in-part of application Ser. No. 07/972,227 filed on Nov. 5, 1992, now abandoned.

BACKGROUND OF THE INVENTION

This invention relates to a method for creating a grip for appliances and sporting equipment and more particularly relates to a method for forming a custom mold on a grip to fit the actual contours of an individual user's hand.

To most effectively use an implement that is to be grasped by hand, the grip of the implement should conform to the contours of the user's hand. One such technique in which the grip is so conformed is described in U.S. Pat. Nos. 4,785,495 and 5,155,878. The technique described in these patents involve placing moldable material on the portion of the device to be gripped, heating the moldable material, applying hand pressure to the heated material, releasing the material and then allowing the material to cure.

A drawback to this technique is that the moldable material must be heated. Consequently, it becomes uncomfortable and difficult for the individual user to apply by hand. Another drawback to this prior molding technique is that it requires external equipment (i.e., a heating element) to soften the moldable material.

SUMMARY OF THE INVENTION

An object of this invention is to provide an improved method and apparatus for forming a custom grip.

Another object of this invention is to create a grip that conforms to the contours of the hand without heat.

A further object of this invention is to custom mold a grip to the hand of an individual user without special equipment.

In the use of this invention, it is also feasible to partition the material prior to curing so that the moldable material can be separated and removed, permitting the handle under the molded material to be refurbished or repaired.

These and other objects are provided with a method for forming a hand grip, the method comprises the steps of placing a light-curable material capable of being molded around a handle of a hand held implement. Pressure is applied to the material with the hand of a user to mold the material, while the temperature of the moldable material is at substantially room temperature. Light is then applied to the molded material to cure the material. In one arrangement, the molding material is split prior to curing so that it can be divided and easily removed from the implement. In another arrangement, the moldable material is covered with a heat shrink tube to coat and protect the moldable material.

BRIEF DESCRIPTION OF DRAWINGS

FIG. 1 is a longitudinal cross sectional view of a baseball bat handle having a moldable material on the outside surface.

FIG. 2 is a longitudinal cross sectional view of the baseball bat in FIG. 1 after molding the moldable material.

FIG. 3 is a cross sectional view along line 3—3 of FIG. 1.

FIG. 4 is a cross section view along line 4—4 of FIG. 2.

FIG. 5 is a perspective view of the moldable material.

FIG. 6 is a perspective view of a baseball bat handle as the moldable material is being wrapped.

DETAILED DESCRIPTION OF PREFERRED EMBODIMENTS

Figure 7:
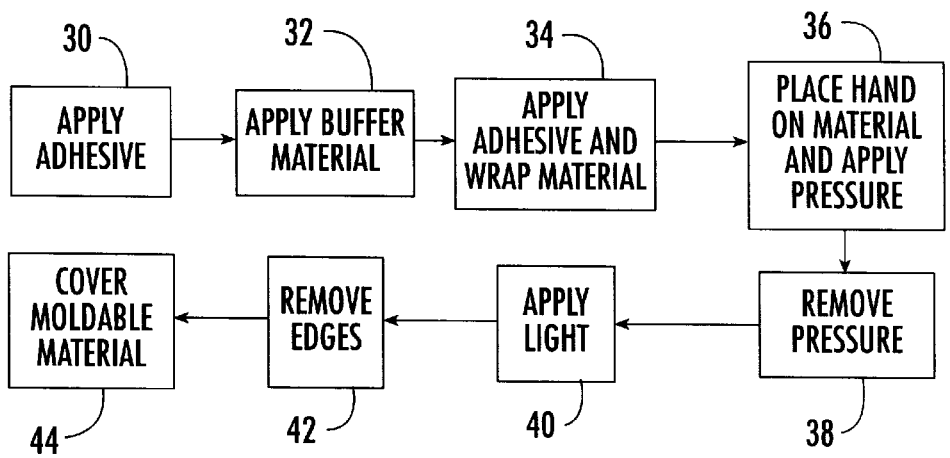
FIG. 7 is a block diagram of the method for forming a grip.

Referring to FIGS. 1 and 3, there is shown a preformed grip designated generally as 10, that includes a light curable moldable material 12 attached on its inside surface with adhesive 14, a buffer material 16 and a second adhesive 18 to a handle or hand held implement 20. Once material 12 is attached to implement 20, the hand of a user applies pressure to the outside surface of material 12 to mold material 12 to conform to the shape of the user's hand. Light, preferably in the blue spectrum, is then applied to material 12 for a predetermined time period, typically 15 minutes for strong light sources, to cause material 12 to cure. Referring to FIGS. 2 and 4, once material 12 is cured, a heat shrinkable material 22 may optionally be applied to the outside surface of material 12.

Referring to FIG. 5, there is shown light curable molded material 12, which is preferably a TRIAD ULC custom tray material available from Dentsply, York Division, York, Pa. Specific details of the fabrication of this material are described in U.S. Pat. Nos. 4,396,377; 4,396,476; 4,552,486; 4,698,373 and 4,711,913, which are incorporated in this disclosure by reference. Material 12 may, for example, be wrapped tightly around implement 18 in a spiral fashion shown in FIG. 6. It may also be applied in many cylindrical sections until the area requiring a hand grip is covered fully.

The implement 20 shown in FIGS. 1–4 is a baseball bat. However, the moldable material 12 may be applied to a wide range of items that require custom molded grips. A sample list of items include, golf clubs, fishing pole handles, shift levers, bicycle handles, motor cycle handles, fire alarm handles, oars, canoe paddles, and weight-lifting equipment.

If a shaft or grip area of a handle 20 which is to receive the custom grip is constructed of a hard material, then a soft buffer material 16 may be placed between handle 20 and moldable material 12 to prevent vibration that may fracture the material 12. Examples of said soft buffer material include rubber, soft plastic, adhesive tape, or synthetics. Buffer material 16 may also be applied to a hard handle 20 with an adhesive 14 and in a manner that prevents the buffer material 16 from contacting moldable material 12.

If the handle 20 is constructed of a soft material, then the buffer material 16 may not be necessary, and material 12 may then be applied directly to handle 20.

Referring to FIG. 7, there is shown a block diagram of the method for molding a grip to implement 20. In the first step 30, adhesive is applied to the implement 20. Step 30 is optional and may not be required if implement 20 has a rough surface.

In the next step 32, a soft buffer material 16 is applied over the adhesive. As previously discussed, buffer material 16 may not be required in all cases.

In step 34, adhesive 14 is applied over the buffer material 16 outer surface and the moldable material 12 is wrapped around handle 20. The moldable material 12 is preferably wrapped in strips, sheets, or manually wrap molded out of bulk material around the handle 20 in order to fully cover the area to receive the moldable material 12.

Once the moldable material 12 is wrapped around the handle 20, the user places his hand over and around the moldable material 12 in step 36 and applies pressure until the desired hand grip conformity is obtained. In step 38, the hand is then removed from the handle in a manner not to disturb the formed custom grip.

In step 40, light is then applied to moldable material 12 forcing it to cure through catalytic action. The light applied for the aforementioned TRIAD ULC material is preferably in the blue spectrum. Any sharp edges of the moldable material 12 are then removed or recontoured in step 42, with any convention sharp tool or sand paper. In step 44, a heat shrink tubing 22 or the like may be placed over the handle in close or tight proximity to the custom grip to improve grip performance and appearance. In the case of heat shrink tubing, heat would be applied to the tubing once placed on the outside surface of material 22 to cause it to shrink. and conform to the shape of the material 12.

Figure 8:
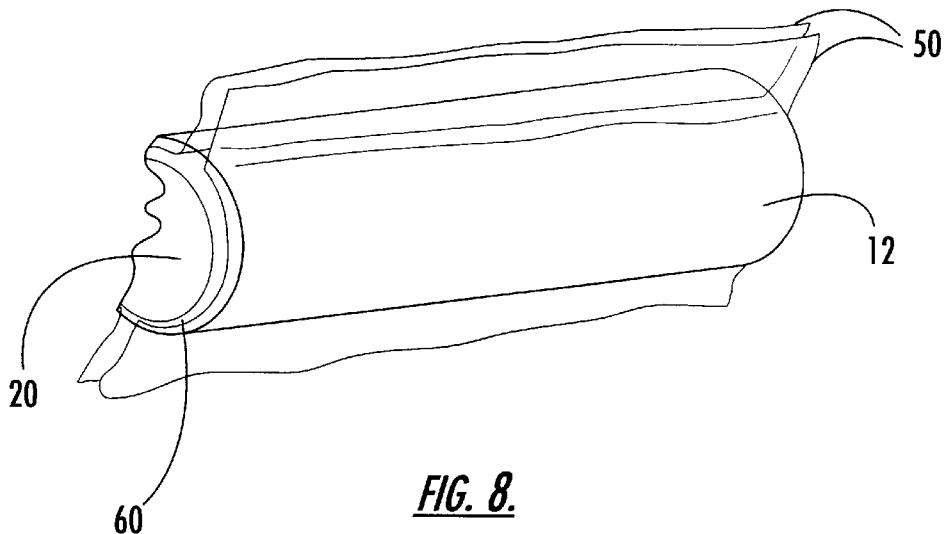
FIG. 8 is a perspective view of an alternate embodiment of the material on the handle shown in FIG. 6 using cellophane to separate handle parts.

In some applications, such as firearm grips, it is necessary to remove material 12 to clean the grip. Applications for removing the material are discussed with. reference to FIG. 8 which shows an alternate arrangement. with at least two abutting sheets of cellophane 50 being placed over the handle 20 on the outside surface of buffer material 16. Edges of the cellophane 50 extend outward from. the handle 20 to form two separate abutting grip portions. Using conventional means, the moldable material 12 is then placed into both portions, and the hand of the user applies pressure to the molding material 12. Once molded, light is applied to material 12 to cure it, as described above. The portions of moldable material 12 are separated from each other, and the cellophane 50 and then removed from handle 20. Once material 12 is removed, the cellophane is discarded and material 12 is put back into place. By using cellophane, material 12 is divided into different portions to allow easy removal from handle 20.

Figure 9:
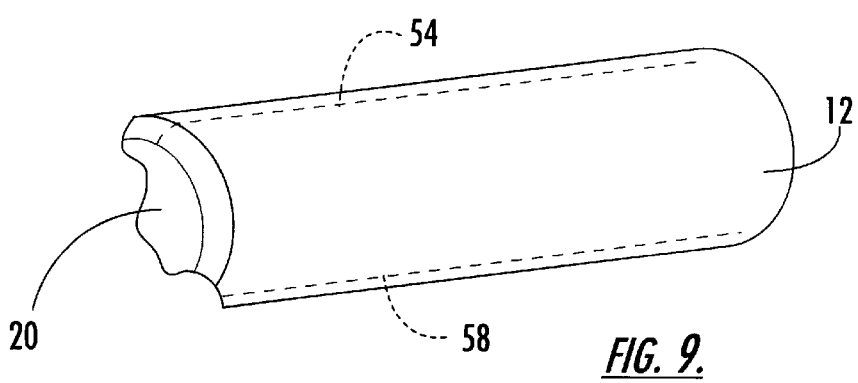
FIG. 9 is a perspective view of another alternate arrangement of the material on the handle shown in FIG. 6 with the material scored into separate portions.

Referring to FIG. 9, there is shown the moldable material 12, with two score lines 54 and 58. Moldable material 12, prior to curing, is cut along score lines 54 and 58. After curing, heat shrink tubing may be applied to the outside surface of material 12 to hold it on the handle 20. By scoring the moldable material 12, it can be separated from handle 20 so that handle 20 can be cleaned.

This concludes the description of the preferred embodiments. A reading by those skilled in the art will bring to mind various changes without departing from the spirit and scope of the invention. It is intended, however that the invention only be limited by the following appended claims.

What is claimed is:

1. A method of forming a hand grip onto an implement having a handle or grip comprising the steps of:

placing a light activated polymerizing polymer capable of being molded at substantially room temperature around the grip or handle of the implement;

applying pressure to the moldable material with the hand of a user to mold the material to the contours of that hand, while the temperature of said moldable material is at substantially room temperature; and applying light to cure the moldable material.

2. The method recited in claim 1 wherein the moldable material is TRIAD ULC tray material from Dentsply.

3. The method recited in claim 2 wherein the light applying step comprises the step of applying light in the blue spectrum.

4. The method recited in claim 1 further comprising the step of applying an adhesive between the grip or handle of the implement and the light activated polymerizing polymer.

5. The method recited in claim 1 further comprising the step of placing a buffer layer between the light activated polymerizing polymer and the grip or handle of the implement.

6. The method recited in claim 1 further comprising the step of forming the light activated polymerizing polymer into strips, and wrapping the strips about the grip or handle before the pressure applying and light curing steps.

7. A hand grip molded to fit a hand of an individual person, the grip comprising:

a handle of an implement; and a light activated polymerizing polymer formed to the shape of the hand at substantially room temperature under pressure of the hand, the molded material surrounding at least a portion of said handle and being capable of retaining its shape after being exposed to light for a predetermined period of time.

8. The grip as recited in claim 7 wherein said. moldable material is TRIAD Custom tray material.

\* \* \* \* \*